(12) United States Patent
Stork (10) Patent No.: US 7,859,942 B2
(45) Date of Patent: Dec. 28, 2010

(54) MEASURING AND MODIFYING DIRECTIONALITY OF SEISMIC INTERFEROMETRY DATA

(76) Inventor: Christof Stork, 855 S. Milwaukee St., Denver, CO (US) 80209

( * ) Notice: Subject to any disclaimer, the term of this patent is extended or adjusted under 35 U.S.C. 154(b) by 725 days.

(21) Appl. No.: 11/680,797

(22) Filed: Mar. 1, 2007

(65) Prior Publication Data

US 2008/0215246 A1    Sep. 4, 2008

(51) Int. Cl.
*G01V 1/00*    (2006.01)
(52) U.S. Cl. ................................ 367/38; 47/56; 47/62
(58) Field of Classification Search ................ 367/38, 367/47, 56, 62
See application file for complete search history.

(56) References Cited

U.S. PATENT DOCUMENTS

| | | | |
|---|---|---|---|
| 6,747,915 B2 | 6/2004 | Calvert | |
| 7,380,455 B2 * | 6/2008 | Workman | 73/602 |
| 7,447,115 B2 * | 11/2008 | Ferber et al. | 367/52 |
| 7,453,765 B2 * | 11/2008 | Ikelle | 367/38 |
| 7,508,736 B2 * | 3/2009 | Lou et al. | 367/57 |
| 2003/0050759 A1 | 3/2003 | Srnka et al. | |
| 2006/0074562 A1 | 4/2006 | Amundsen et al. | |
| 2006/0248954 A1 | 11/2006 | Snieder | |
| 2007/0104028 A1 * | 5/2007 | Van Manen et al. | 367/38 |

OTHER PUBLICATIONS

Curtis et al. Seismic interferometry—turning noise into signal. The Leading Edge. vol. 25. pp. 1082-1092. Sep. 2006.
Draganov et al. Seismic interferometry on background-noise field data. SEG Expanded Abstracts 25, 590. 2006.
Draganov et al. Seismic interferometry: Reconstructing the earth's reflection response. Geophysics. vol. 71, No. 4. pp. S161-S170. Aug. 17, 2006.
Draganov et al. Retrieval of reflections from seismic background-noise measurements. Geophysical Research Letters. vol. 34. L04305, 10.1029/2006GL028735. pp. 1-4. Feb. 22, 2007.
Sabra et al. Extracting time-domain Green's function estimates from ambient seismic noise. Geophysical Research Letters. vol. 32. 10.1029/2004GL021862. Feb. 15, 2005.
Schuster, G.T. Theory of Daylight/Interferometric Imaging: Tutorial. 63rd Annual Conference and Exhibition, EAGE, Extended abstracts, A-32. 2001.
Wapenaar et al. Theory of acoustic daylight imaging revisited. SEG Expanded Abstracts 21, 2269. 2002.
Wapenaar et al. Seismic interferometry: a comparison of approaches. SEG Expanded Abstracts 23, 1981. 2004.

* cited by examiner

*Primary Examiner*—Mark Hellner
(74) *Attorney, Agent, or Firm*—Marsh Fischmann & Breyfogle LLP (57) ABSTRACT

Methods and apparatuses are disclosed for replacing the individual receivers used with a seismic interferometry process with an array of seismic receivers and then manipulating the array data in order to measure and modify the typical non-uniform directionality function of the background seismic energy. The non-uniform directionality function is a significant cause of noise with seismic interferometry. Furthermore, the array of receivers may be used to significantly enhance the preferred reflection energy and damp undesirable near surface energy. The directionality function may be modified by using an array of receivers for the virtual source location of seismic interferometry to measure the non-uniform directionality function, generating multiplication factors, and applying the multiplication factors to convert the measured directionality function into a desired directionality function.

51 Claims, 7 Drawing Sheets

MEASURING AND MODIFYING DIRECTIONALITY OF SEISMIC INTERFEROMETRY DATA

FIELD OF THE INVENTION

The present invention relates to seismic surveying and more particularly to seismic interferometry.

BACKGROUND

Seismic surveying techniques use reflected seismic waves to determine underground geologic structure. One manner of seismic surveying uses an active source to generate one or more controlled seismic waves. The active source may, for example, be an explosive, an air gun or a vibrator truck. The seismic waves generated by the active source are reflected off of underground geologic structure, and the reflected seismic waves are typically recorded by a plurality of receivers such as seismic motion sensors, geophones, accelerometers, or hydrophones. The recordings may be vertical ground motion (velocity or acceleration), pressure, components (e.g. three directions) of ground motion or a combination thereof. Seismic data processing methods are then used to process the recorded response and produce an image of underground geologic structure therefrom.

Seismic interferometry is a method of seismic data collection and manipulation or processing that is able to use a receiver as a virtual source to simulate and replace an active source. Typically, seismic waves are recorded at a primary location (the virtual source location). The seismic waves recorded at the primary location may be deliberate or non-deliberate seismic waves present in the earth such as, for example, natural background seismic waves due to ocean wave action, seismic waves due to vehicle traffic, or even seismic waves caused by a remotely positioned active source. At the same time, seismic waves are also recorded at at least one additional location, a secondary location of the seismic interferometry process. The time series recorded at the secondary location is deconvolved using the time series recorded at the virtual source location. In instances where the receivers measure multiple components of ground motion, the deconvolution is performed between each of the components. Since the seismic waves recorded at the virtual source location are reflected from the surface of the earth, a portion of these reflected seismic waves will reflect off of underground geologic structure and reach the additional location. In this regard, the deconvolution of the components of the time series recorded at the secondary location contains the same response as there would be if there was a source for each of the ground motion components at the primary location generating seismic waves being recorded by a receiver at the additional location. Thus, this seismic interferometry data may substitute for conventional active seismic source data. Active source seismic data processing methods may then be used to produce an image of underground geologic structure in a manner similar to active source seismic surveying.

SUMMARY

The present invention facilitates the use of seismic interferometric techniques in determining underground geologic structure. In this regard, one difficulty with the seismic interferometric approach is that the seismic wavefield recorded at the virtual source often has an undesirable directionality pattern or function. A directionality component of the recorded seismic wavefield used for seismic interferometry (e.g., energy coming from one angle and azimuth) can and often does have significantly different strength or amplitude than other directionality components of the seismic wavefield (e.g., energy coming from other angles and/or azimuths). As a result, the virtual source from seismic interferometry will have a non-uniform energy directionality pattern or function. This non-uniform energy function may exist for each ground motion component. This situation is different from an active source for which the energy directionality function is generally well known and often uniform in angle and azimuth.

The current state of the art of seismic interferometry does not consider the non-uniform directionality of the energy at the virtual source and does not provide for a method to measure it and correct for it. In this regard, many proposed seismic interferometric techniques only consider single receivers at the virtual source location. With a single receiver, it is not possible to measure the directionality of the seismic energy.

Embodiments described herein present, inter alia, methods to measure and correct the non-uniform directionality function of the vibrations recorded at the virtual source location when performing seismic interferometry by replacing the single receiver that acts as a virtual source with an array of receivers, which will usually be two dimensional (2D), but may be one dimensional (1D). The use of an array of receivers at the virtual source location allows for measuring the strength of the non-uniform directionality function of the seismic energy recorded at the virtual source location by applying beam forming or related methods on the array to transform the data into different directionality components.

After the strength of the directionality components is measured, multiplication factors can be determined to change the directionality component strengths to produce a desired directionality function. The multiplication factors may, for example, be determined by dividing the desired strength of a directionality component with the measured strength. This may be performed subject to damping criteria and tapering. The multiplication factors may then be applied by adjusting the strength of the directionality components in one of several ways in either the seismic interferometry operation or in the conventional seismic data processing. The measurement of the directionality components, the determination of the multiplication factors, and the application of the multiplication factors can be performed for each ground motion component.

Embodiments described herein enable the non-uniform directionality of seismic energy received at a virtual source during a seismic interferometry process to be measured and corrected for in later processing. This may result in a more accurate geologic survey than could be accomplished using known seismic interferometry processes. In this regard, the embodiments described herein may enable expanded use of interferometric virtual source methods, which has several advantages over traditional active source seismic surveying. For example, since receivers are less expensive than active seismic sources, there may be a cost savings involved with replacing an active source with an array of receivers. Furthermore, the potential for environmental damage and the risks associated with explosives and heavy machinery inherent in the use of an active source can be avoided, or at least mitigated by positioning the active source in a less sensitive area. Also, receivers may be easier to place in difficult locations, such as hilly terrain or in populated areas.

According to an aspect, a method of performing seismic interferometry to obtain information related to subsurface structure includes positioning a plurality of seismic receivers to receive seismic waves, using at least one of the seismic receivers as a secondary location receiver for seismic interferometry, recording a time series of seismic waves incident on each seismic receiver, and modifying a directionality function of the virtual source for seismic interferometry.

The positioning may include arranging at least a portion of the plurality of seismic receivers in an array within an area associated with a location of a virtual source for seismic interferometry. The seismic receivers may be distributed in a uniform or non-uniform manner over the area. The positioning and quantity of seismic receivers may be at least partially dependent on the surface wavelength corresponding to the lowest and highest frequency seismic waves to be recorded. Seismic receivers used as a secondary location receiver for seismic interferometry may be among the portion of the plurality of seismic receivers arranged in the array or they may be separate from the portion of the plurality of seismic receivers arranged in the array.

Modifying the directionality function may involve combining at least two of the time series from the seismic receivers included in the array. The combining may include performing a spatial domain transform over the array locations of the time series of seismic waves incident on each seismic receiver of the array. This transform may separate the seismic waves incident on the array into different directionality components. Each directionality component may correspond to a value of the directionality function.

Multiplication factors, time shifts, and phase shifts may be applied to the data traces from at least two of the individual receivers of the array. The multiplication factors may be applied in the transform domain or equivalent ones may be applied in the spatial domain of the original data. Additionally, the multiplication factors may be applied by electronically joining the receivers in the field. Further, the multiplication factors may be applied when performing a seismic migration, an imaging, an inversion process or a combination thereof. Regardless of how they are applied, the multiplication factors may be used to obtain a uniform directionality function or an intentionally non-uniform directionality function.

According to an aspect, a method of modifying a directionality function of a virtual source used in seismic interferometry includes recording seismic wave data incident on each individual seismic receiver of an array of seismic receivers, performing a domain transform on the recorded seismic wave data to separate the recorded seismic wave data into different transform components, measuring a signal strength measurement for each transform component, and determining multiplication factors to convert the measured signal strength for each transform component into a desired strength for each transform component. The virtual source for the seismic interferometry may be associated with the array of seismic receivers where each receiver of the array has an associated location within the array. The determination of the multiplication factors may include dividing the desired strength for each individual transform component by the measured signal strength for each individual transform component.

According to an aspect, a seismic interferometric system operable to obtain information related to subsurface structure includes a plurality of seismic receivers, at least one recording device operable to record a time series of seismic waves incident on each of the plurality of seismic receivers, and a processor operable to modify a directionality function of the virtual source for seismic interferometry. The plurality of seismic receivers may be positionable such that a portion of them may be arranged in an array within an area associated with a location of a virtual source for seismic interferometry. At least one of the plurality of seismic receivers may be used as a secondary location receiver for seismic interferometry.

Modifying the directionality function may involve combining at least two of the time series from the seismic receivers included in the array.

The processor may be further operable to perform a spatial domain transform over the array locations of the time series of seismic waves incident on each seismic receiver of the array. In this regard, the processor may be operable to separate the recorded seismic wave data into different transform components. Each of these transform components may correspond to a type of wave that has some directionality. The processor may further be capable of measuring a signal strength measurement for each transform component and determining multiplication factors to convert the measured signal strength for each transform component into a desired strength for each transform component.

According to an aspect, a computer program product includes a computer usable medium having computer program code embedded therein. The computer program code may include computer readable program code that may enable a processor to read a data file including a time series of seismic waves incident on each seismic receiver of an array of seismic receivers, read a data file including a time series of seismic waves incident on a secondary location receiver for seismic interferometry, and modify a directionality function of a virtual source for seismic interferometry. The array may be associated with a location of a virtual source for seismic interferometry. The modifying of the directionality function may involve combining at least two of the time series from the seismic receivers included in the array. Moreover, the computer readable program code may enable the processor to perform a spatial domain transform over the array locations of the time series of seismic waves incident on each seismic receiver of the array. This transform may separate the time series of seismic waves incident on each seismic receiver of the array into different directionality components, where each directionality component may correspond to a value of the directionality function.

Additional aspects and corresponding advantages of the present invention will be apparent to those skilled in the art upon consideration of the further description that follows.

DETAILED DESCRIPTION

Figure 1A:
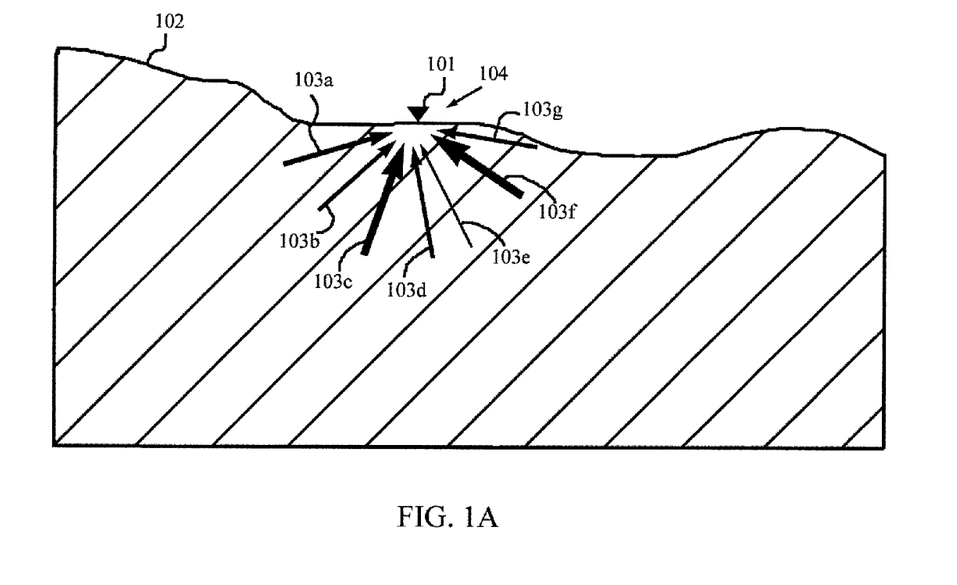
FIG. 1A is a cross sectional schematic view of a seismic sensor placed on the Earth's surface and a set of sample seismic directionality components with different amplitudes incident upon the seismic sensor.

As noted above, seismic interferometry utilizes seismic energy incident upon a particular location as a virtual source of seismic waves for a seismic survey. FIG. 1A is a cross sectional schematic view showing a receiver 101 placed on the Earth's surface 102 at a particular location 104. A plurality of seismic directionality components (referred to herein alternatively as directionality components) incident at the receiver 101 are represented by directionality component vectors 103a through 103g. A seismic directionality component is the portion of the seismic waves incident on the receiver from a specific direction. As illustrated, the seismic directionality components incident at location 104 may be non-uniform, and the varying size of the illustrated directionality component vectors 103a through 103g represents the varying amplitudes of directionality components incident at the location 104. These directionality components are separate for each ground motion component recorded at the receiver.

When performing seismic interferometry using data that has not been modified or filtered to take into account the non-uniformity of the directionality components incident at the virtual source location, the non-uniformity of the directionality components may distort the geologic image resulting from the seismic data processing and may amplify the noise in the data. This noise may result in a degraded image of the geologic structure after processing relative to an image that can be obtained from the data if the non-uniformity of the directionality components is reduced or eliminated.

However, a single receiver, such as receiver 101 illustrated in FIG. 1A, is not capable of measuring the non-uniformity of the directionality components incident at location 104. If the non-uniformity of the directionality components is not known, the data collected cannot be corrected for the non-uniformity.

Embodiments of the present invention facilitate eliminating or reducing effects from the non-uniformity of directionality components incident at the location of a virtual source used in seismic interferometry. This may be achieved by using an array of receivers to record seismic waves incident at the virtual source location of seismic interferometry while at the same time recording, with an individual receiver, seismic waves incident at the secondary location of seismic interferometry. Additionally, and at the same time, other individual receivers may be recording seismic waves incident at additional secondary locations. Moreover, individual receivers located in the array may be used as part of the virtual source array and as a secondary location for seismic interferometry. The receivers may be operable to record multiple ground motion components and each ground motion component may be treated separately.

The data collected at the array may be spatially transformed into a different domain where each transform component of the new domain corresponds to an approximate directionality of the seismic energy. The non-uniformity of the directionality components may then be measured. Multiplication factors may then be determined that modify the non-uniform recorded directionality components into, for example, uniform components or components with a deliberate desired non-uniform distribution that improve the final processed image. The multiplication factors may be applied in a number of manners and at different stages of seismic data processing including as described herein. This process of measuring the strength of directionality components, determining multiplication factors, and modifying the directionality function can be performed separately for each ground motion component.

The application of the multiplication factors may result in a seismic interferometry signal without the effect of the non-uniform strength of the directionality components. The resulting virtual source may simulate an active source with a uniform energy distribution over all directionality components or a source with a deliberate non-uniform energy distribution that boosts desired directionality components and damps undesirable directionality components.

Figure 2:
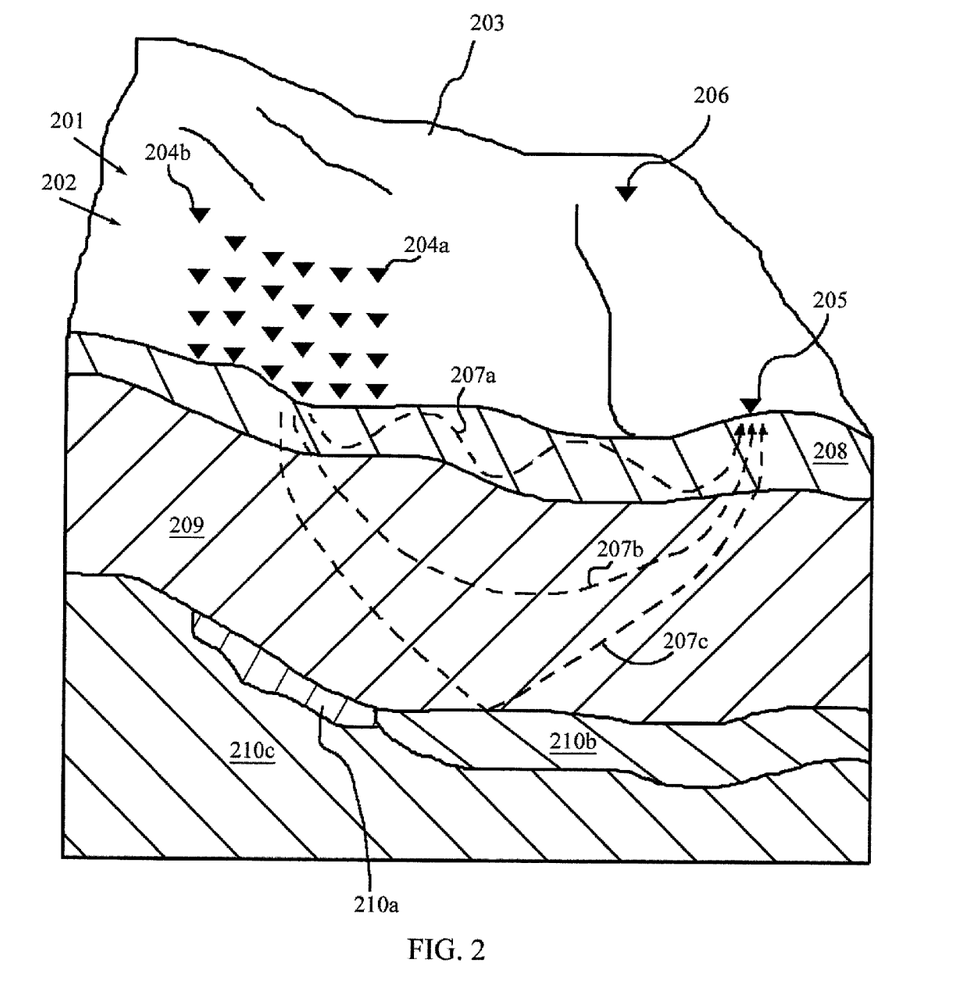
FIG. 2 is a partial cross sectional schematic view of a set of sensors placed on the Earth's surface.

As noted above, an array of receivers may be used to collect seismic data from which directionality components may be determined. An exemplary arrangement is illustrated in FIG. 2. In FIG. 2, an array 201 of receivers is positioned on the Earth's surface 203 in an area 202, which is the virtual source location of seismic interferometry. Each individual receiver of the array 201, such as receiver 204a may be capable of obtaining a time series recording of seismic activity at its location.

Generally, the array 201 may be one dimensional (e.g. a single row of receivers) or two-dimensional (e.g., multiple rows and columns of receivers) and the individual receivers of the array 201 and individual receivers outside of the array, such as individual receivers 205 and 206, may be located at or near the surface 203. As used herein, the terms "one-dimensional" and "two-dimensional" may include arrays where one or more of the individual receivers of the array 201 are located at different altitudes with respect to other receivers in the array (e.g., one individual receiver of the array 201 may be located on a hillside at a higher elevation than another individual receiver located deep in a valley). However, no two individual receivers within array 201 occupy the same latitude and longitude. In this regard, if the positions of the individual receivers of the array 201 were indicated on a two-dimensional map of the surface 203, no two indications of the locations of individual receivers would occupy the same space. In instances where a body of water covers the Earth's surface at the location where the receiver is to be placed, the receiver may be placed at the bottom of the body of water (e.g., on the sea floor). Further, it is possible for one or more of the receivers in array 201 to be buried.

Figure 3A:
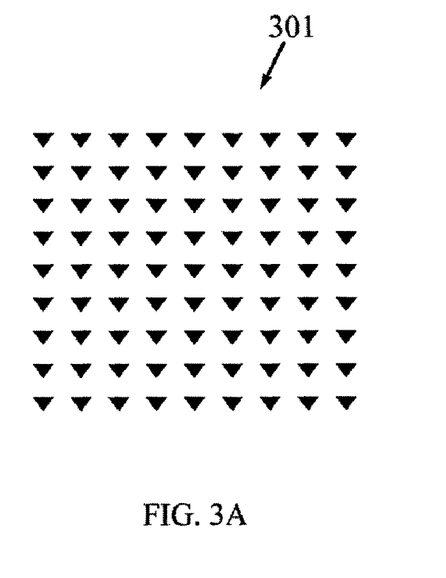
FIGS. 3A, 3B and 3C are top schematic views of exemplary sensor arrays.

The arrangement of the receivers in the array 201 may be configured to achieve particular characteristics and/or accommodate local terrain. For example, an array 301 in which the receivers are uniformly distributed throughout an area encompassed by the array 301, such as that illustrated in FIG. 3A, may be utilized. The overall size of the uniform array 301 may be selected based on a surface wavelength corresponding to the minimum frequency to be recorded. The spacing between the individual receivers of the uniform array 301 may be selected based on a surface wavelength corresponding to the maximum frequency to be recorded. The number of receivers may be selected based on the bandwidth between the lowest and highest frequencies to be recorded.

Figure 3B:
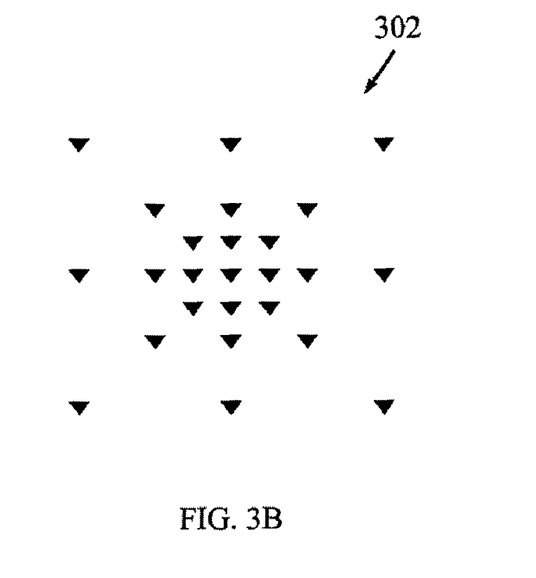

The individual receivers may also be non-uniformly distributed as illustrated in the exemplary array 302 of FIG. 3B. In the non-uniform array 302, the spacing between individual receivers of the array 302 along the outer edges of the array 302 is greater than the spacing between the individual receivers of the array 302 toward the center of the array 302. In such an arrangement, the minimum and maximum distances between individual receivers of the array 302 may be based on the maximum and minimum frequencies, respectively, of directionality components to be measured.

Figure 3C:
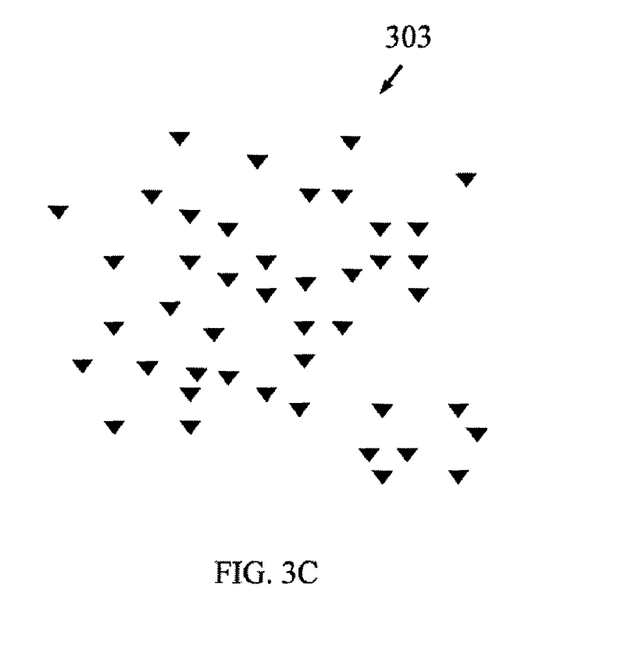

The individual receivers may also be randomly or partially randomly distributed as illustrated in the exemplary array 303 of FIG. 3C. Such an arrangement may be partially dictated by local topography, buildings, or other land and habitation features. For example, rough terrain may preclude or make extremely difficult the formation of arrays such as those illustrated in FIGS. 3A and 3B. Many other arrangements of the individual receivers within the array are possible in addition to the arrangements illustrated in FIGS. 3A-3C.

Referring again to FIG. 2, the array 201 may be used to record data, determine directionality components, and compute multiplication factors. The array may also be used as a virtual source that applies the multiplication factors to modify the directionality components for an interferometric seismic survey. An individual receiver located outside of the array 201, such as receivers 205 and 206, may function as a secondary receiver for the seismic interferometric survey. Moreover, one or more of the individual receivers of the array 201 may function as both a member of the array 201 for purposes of directionality component modification and as a secondary receiver used for seismic interferometry.

The data recorded by the array 201 may consist of a separate time series recorded by each individual receiver of the array 201. This data may be used to determine the amplitude and directionality of seismic directionality components incident on the area of the array 201. The amplitude and directionality determination may be accomplished using any of a variety of spatial transform methods that transform the data over the receiver locations into directionality components. This transform may be accomplished by combining at least two of the time series recorded by individual receivers of the array 201. For example, 1D or 2D slant stacks, 1D or 2D beam forming, and/or 1D or 2D Fast Fourier Transforms (FFTs) may be employed to determine the amplitude and directionality of seismic directionality components from the data recorded by the array 201. Other methods, such as Radon, discreet cosine, Gabor and Wigner transforms may also be utilized. Variations of the above-mentioned methods may also be utilized. All these transforms, and others, share the property that they mathematically combine two or more traces to produce the transformed data. Whatever process is used, uneven weighting and/or tapering may be employed during the process. Time shifts may be applied before the transform to correct for the deviations of the receiver locations from a flat surface. The recorded data may be converted from the time domain to another domain, such as the frequency domain, prior to performing the spatial transform to determine and modify directionality components. This process can be applied for each ground motion component.

Once the array data is transformed into directionality components, the total energy for each directionality component may be measured. Other signal strength measurement techniques may also be utilized. The measurement may be a single measurement for each directionality component direction or it can be multiple measurements for each directionality component direction for the different data components of each trace domain, such as a time window or frequency.

An alternative way of measuring signal strengths of directionality components without performing a transformation is to apply a set of multiplication factors, time shifts, and phase rotations to the untransformed data, sum the data, and measure signal strength from the result. The set of multiplication factors, time shifts, and phase rotations are performed to emphasize and possibly isolate one or more directionality components. Then the process is repeated with a different set of multiplication factors, time shifts, or phase rotations for a different directionality component or group of directionality components.

Figure 1B:
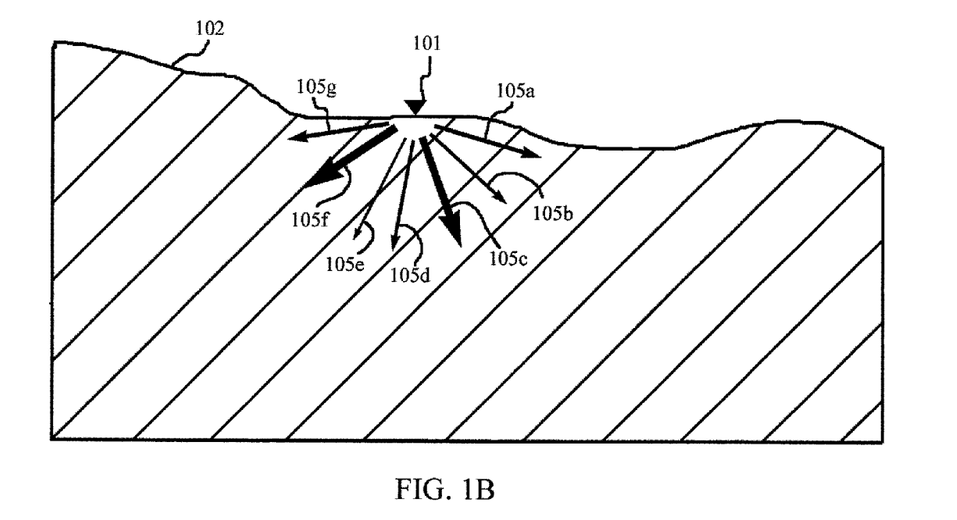
FIG. 1B is a cross sectional schematic view of the sensor of FIG. 1A and reflected directionality components with different strengths.

The measured directionality components may be used to compute the multiplication factors or to modify the directionality components of a virtual source at the location 202 of the array 201 for use in a seismic survey using seismic interferometry methods (a seismic interferometry survey). The directionality components (e.g., represented by directionality component vectors 103a through 103g in FIG. 1A) may be determined as described herein. To use this information to modify the directionality components of a virtual source in seismic interferometry, it may be assumed, as illustrated in FIG. 1B, that the Earth's surface 102 is a perfect reflector of the directionality components. For example, directionality component vector 105f represents a directionality component vector that is a reflection of directionality component vector 103f shown in FIG. 1A. Similarly, each directionality component vector 105a through 105g of FIG. 1B represents a reflection of the directionality component vectors illustrated in FIG. 1A. Once the time series data received at the virtual source array has been transformed into separate directionality components, the amplitude of the directionality components can be modified with multiplication factors before further processing. The multiplication factors can be explicitly applied to each directionality component or implicitly during further manipulation of the data, such as active source seismic processing.

As shown in FIG. 2, one or more portions of one or more of the reflected directionality components (e.g. represented by directionality component vectors 105a through 105g in FIG. 1B) may be transmitted through the Earth from the first location 202 to the locations(s) of the additional receivers 205 and 206. Such reflected seismic waves are represented by dashed arrows 207a through 207c in FIG. 2, and as shown, some seismic waves (e.g. 207a) may remain in near surface waveguide structure 208. Other seismic waves (e.g. 207b and 207c) may penetrate deeper structure 209 with some (e.g. 207b) being refracted toward the additional receivers 205 and 206 and some (e.g. 207c) being reflected at a boundary between deeper structure 209 and one or more still deeper structures 210a through 210c.

Figure 4A:
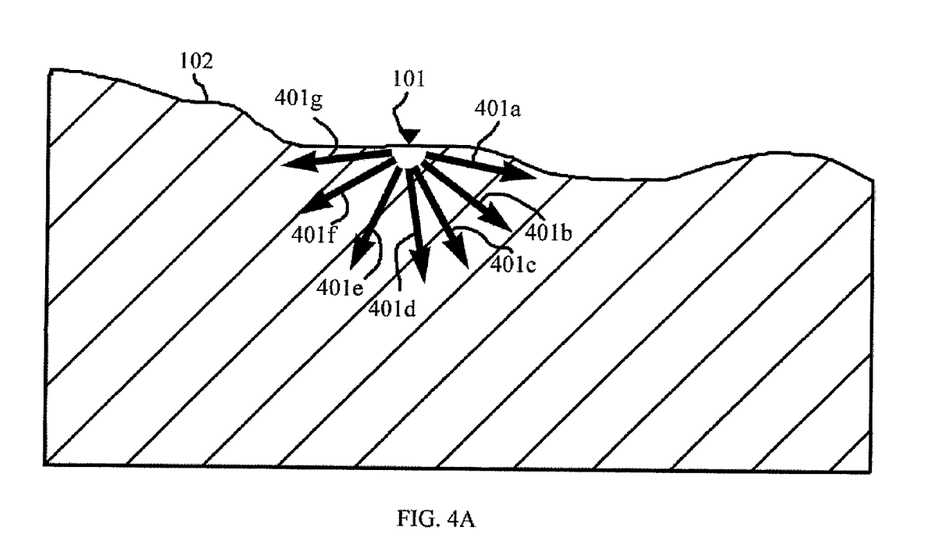
FIGS. 4A and 4B are cross sectional schematic views of the sensor of FIG. 1A and reflected directionality component vectors after modification.

The determined multiplication factors that are applied to the directionality components may be used to control a directionality function of the virtual source used in seismic interferometry. As previously noted, known methods of performing seismic interferometry do not take into account the non-uniform strengths of the seismic waves with different directionality incident at the virtual source. As such, image distortion and noise may be at higher levels relative to an active source seismic survey when using known seismic interferometry methods. This distortion and noise may be reduced or eliminated by modifying the directionality function of the virtual source. For example, the directionality of the virtual source may be controlled to produce a uniform directionality similar to uniform seismic waves generated by active sources. The resultant uniform directionality function may be represented by uniform directionality component vectors such as directionality component vectors 401a through 401g of FIG. 4A. These directionality components are separate for each ground motion component.

Figure 4B:
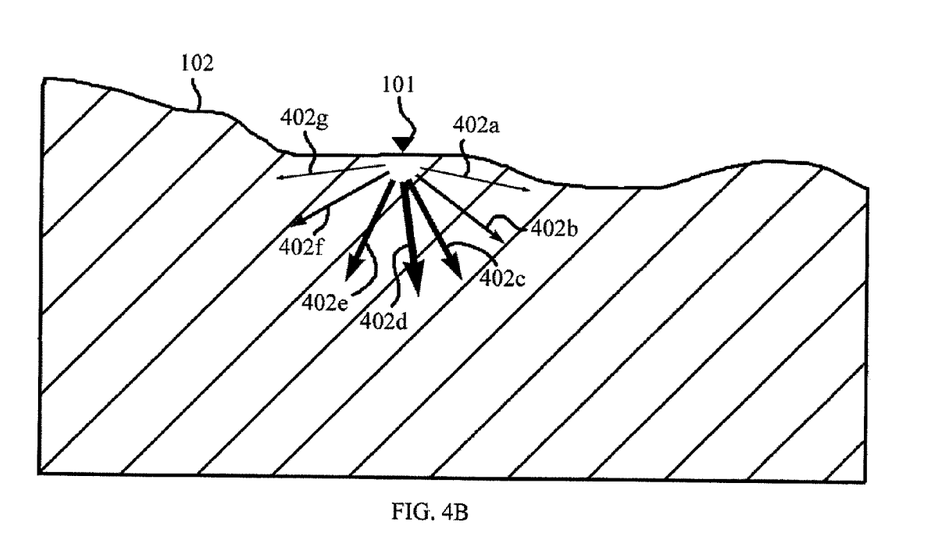

Other desired directionalities of the virtual source may be utilized. For example, if it is desired to reduce noise in the collected data due to seismic waves traveling near the surface (e.g., waves such as wave 207a of FIG. 2), the strength of waves reflected at the virtual source and traveling close to parallel with the Earth's surface (such as waves 105a and 105g of FIG. 1B) may be deemphasized, while directionality components traveling at or near perpendicular to the Earth's surface (e.g., waves 105c and 105d of FIG. 1B) may be emphasized. Such a non-uniform directionality function may be represented by the directionality component vectors 402a through 402g of FIG. 4B. Since near surface seismic waves may introduce noise into data collected during a seismic survey, using a directionality function such as that illustrated in FIG. 4B may serve to reduce the noise level and subsequently improve image quality and reduce the amount of processing needed in performing seismic interferometry with the collected data. Still other directionality functions may be created. For example, other functions may be generated to emphasize particular ray paths, such as refraction or reflection ray paths through a particular layer or section of the geologic structure being examined. Also, a directionality function may be selected to compensate for certain geologic structure or to emphasize near surface seismic waves.

Creating a desired directionality function may include determining multiplication factors that may then be applied to modify the measured directionality function to the desired function. For example, multiplication factors may be determined by dividing the desired strength for a particular directionality component by the measured strength for that particular directionality component as described herein in connection with FIGS. 4A & 4B. In instances where the measured strength of a particular directionality component is below a predetermined threshold, the measured strength may be increased to a value exceeding that threshold prior to the determination of the multiplication factor. In this manner, dividing the desired strength by a relatively small measured strength (and the corresponding large multiplication factor) that may be unreliable can be avoided.

Where it is desired that the virtual source be a directionally uniform source, the same desired strength may be used in determining each multiplication factor. Where it is desired that the virtual source be a directionally non-uniform source, the desired strength used in determining various multiplication factors may vary (e.g., to produce the non-uniform functions previously discussed).

Other methods may be used to measure the directionality components of a virtual source used to either compute the multiplication factors or apply the multiplication factors. In a first example, damping factors may be applied to certain measured directionality components (e.g., directionality components traveling parallel to the Earth's surface). In a second example, measurements made at a subset of receivers of the array may be modified prior to determination of directionality components (e.g., the array readings may be tapered toward the edges of the array).

The processing described above in relation to data generated by the receivers of the array may be performed on the entire recorded time series. Alternatively, one or more of the recorded time series may be subdivided into time window subsets and these subsets may be processed as described herein. This may include independently determining multiplication factors for each time window.

In instances where the data from the receivers of the array are converted into a derivative domain of the time domain, multiplication factors may be separately determined and applied for each value in the derivative domain of the time domain. For example, where the derivative domain of the time domain is the frequency domain, multiplication factors may be separately determined for each frequency value and each directionality component.

Once determined, the multiplication factors may be utilized in a variety of ways to enhance a seismic interferometry process. The multiplication factors may have a number of characteristics. For example, the multiplication factors may be non-unitary, and the multiplication factors may be complex numbers.

Moreover, the multiplication factors may be applicable over a wide geographic region, possibly hundreds of miles wide. The array used to determine the multiplication factors can be different than the array used to apply the multiplication factors. In this regard, once a particular set of multiplication factors are determined for a particular region, that set of multiplication factors may be used to modify the directionality function of a plurality of virtual source arrays for seismic interferometry in that same region.

Multiplication factors may be applied in a variety of domains and during different steps or stages in the processing of the data in order to modify the virtual source directionality function. The multiplication factors can be applied early in the interferometry processing, or later in the active source seismic data processing/inversion step. The multiplication factors can be applied in a spatial transform domain or they can be applied in the untransformed domain when the multiplication factors may correspond to time shifts or phase rotations. A common trait of these methods is that they modify the directionality function of the virtual source by combining two or more traces from the receivers in the array.

One method for applying the multiplication factors to the virtual source is to transform the data recorded from the individual receivers of the array into the same domain from which the multiplication factors are computed. Then the multiplication factors can be directly applied by multiplying the appropriate components in the transform domain. Then the data can be transformed back to its original spatial and time domain and the data can be further processed with standard interferometric techniques and active source seismic processing techniques. Or, instead of transforming the data back to the original spatial and time domain, the data can be converted straight into a different domain used by the subsequent interferometric techniques and seismic processing techniques. The data from the individual receivers of the array can be treated as separate traces in the subsequent interferometric or seismic processing, or they can be reduced, combined, or summed into fewer traces. This process can be applied separately for each ground motion component where the traces from a single component are transformed or combined.

Another method for applying the multiplication factors is to transform the data into a domain different than that used to compute the multiplication factors. In this case, the multiplication factors can be transformed from their original domain to the same domain as the seismic data. The transform may involve interpolation from one function of directionality representation to another. This transform of the multiplication factors can be done directly from one domain to another, or indirectly by inverse transforming the multiplication factors to a spatial domain, possibly resampling or interpolating them in the spatial domain, and then transforming them to the new domain that is consistent with that used for the data.

Alternately, the above methods of applying the multiplication factors in the transform domain can be applied in later processing, either during the application of the interferometry processing, or during different stages of seismic data processing. The interferometric processing or the seismic data processing may transform the array data into a different domain. The multiplication factors can then be applied in this domain, possibly transforming the multiplication factors as described above. For example, the data from the individual receivers or the array may go through standard interferometric processing to produce data similar to that from conventional active sources. This data may then go through active source seismic data processing. Here, active source seismic data processing is meant to imply any seismic processing techniques that apply to conventional active source data. These techniques applied to conventional active source data may include standard known methods or new inventive methods. As the data is processed by active source seismic data processing, it may be transformed into a different domain, such as the plane wave domain, or the Tau-P domain, where each component corresponds to some directionality. One such technique is plane wave migration. When the data is in this domain, the multiplication factors can be applied to modify the strength of the directionality components. This process can be applied separately for each ground motion component where the traces from a single component are transformed or combined together.

This application of multiplication factors during active source processing can be performed explicitly, as stated above, by transforming the data into directionality components and modifying their strengths, or it can be performed implicitly. One approach of applying the multiplication factors implicitly is by performing a migration, an imaging, or an inversion process, such as reverse time migration, that simulates a source. Normally this source simulation is done with a point source that has a uniform directionality function. By simulating a source with non-uniform directionality function, the multiplication factors can be applied implicitly. One can produce the non-uniform simulated source directionality function that corresponds to the multiplication factors by taking the original uniform source, possibly extending it over a larger region, transforming it into the same domain as the multiplication factors, apply the multiplication factors, and then transforming back to the original domain. Conversely, one can transform the multiplication factors to the same domain as the simulated source. The simulated source can use multiple ground motion components, each with a different directionality function.

A special case of applying the multiplication factors in a different domain from where they are computed is to apply the multiplication factors directly in the spatial domain. In this way, the multiplication factors can be applied to the data recorded at the individual receivers of the array without transforming the data. For example, the multiplication factors can be transformed into the spatial domain to produce multiplication factors, time shifts, or phase rotations at the receiver locations. This transformation may involve some interpolation. These new multiplication factors, time shifts, or phase rotations may be applied early in the interferometric process or later during active source processing. The data can be summed or partially combined as part of the application of the new multiplication factors, time shifts, or phase rotations. This process can be applied separately for each ground motion component where the traces from a single component are transformed, multiplied, or combined.

Furthermore, the directionality of a virtual source may be modified by interconnecting the receivers of the array in such a manner that a single aggregated time series recorded by the interconnected receivers may be used as a modified virtual source. In this regard, the receivers may be electronically interconnected. Electronic interconnections among the receivers may be accomplished, for example, by directly wiring them together, through wireless links or through a combination of wired and wireless connections in such a manner that the interconnection is functionally similar to applying multiplication factors, time shifts, phase rotations or a combination thereof to produce a virtual source with a desired directionality function.

These and other techniques of modifying the directionality of a virtual source used in seismic interferometry may be used in place of or in conjunction with the use of multiplication factors.

As discussed before, these approaches for applying the multiplication factors may performed on the whole data or on subsets from individual receivers or from individual directionality components in the spatial transform domain. The multiplication factors may be applied in the time domain or a derivative of the time domain, such as the frequency domain. The multiplication factors may be different for each subset or they may be identical. The subsets can be a time window, an individual frequency component, or a group of frequencies.

The above examples of the application of multiplication factors at various stages of the process of determining underlying geologic structure are exemplary. Other mathematically equivalent applications of the multiplication factors are also intended to be within the scope of the present invention. Additionally, various ones or all of the above-described methods and/or their mathematical equivalents may be combined to modify and/or control the directionality of a virtual source.

Figure 5:
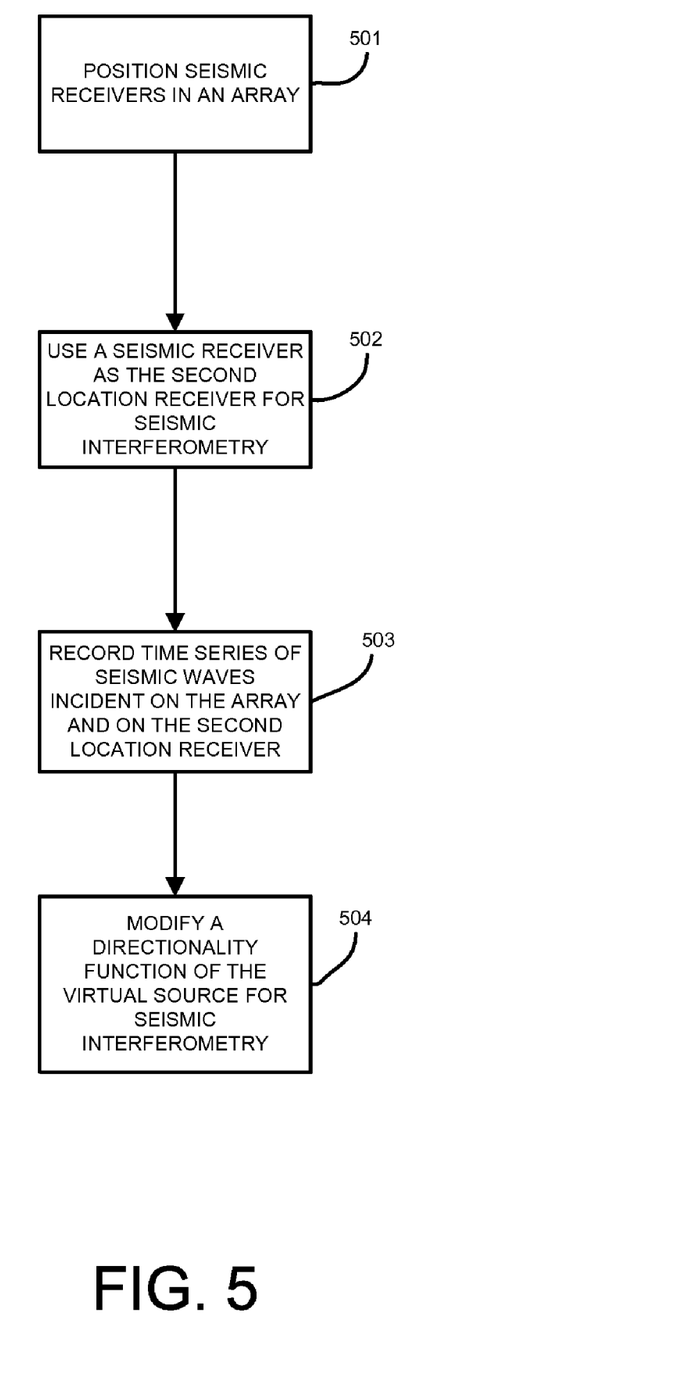
FIG. 5 is a flowchart for one embodiment of a method of performing seismic interferometry.

FIG. 5 is a flow chart of an embodiment of a method of performing seismic interferometry to obtain information related to subsurface structure. Although the flow chart illustrates the steps in a particular order, this is for exemplary purposes only and the order of the steps may be rearranged from that depicted in FIG. 5. The first step 501 illustrated in FIG. 5 may be to position a plurality of seismic receivers in an array. The array may be within an area associated with the location of a virtual source for seismic interferometry.

The next step 502 may be to use a seismic receiver as a secondary location receiver for seismic interferometry. This secondary location receiver may be one of the receivers of the array or it may be a seismic receiver that is not part of the array. The secondary location receiver may be colocated within the area of the array or it may be located remote from the array (e.g., such as receiver 205 of FIG. 2).

The following step 503 may be to use the seismic receivers (e.g., the receivers of the array and the secondary location receiver) to record seismic waves incident on the seismic receivers. This recording may take the form of a separate time series for every individual seismic receiver used. Alternatively, some or all of the outputs of the seismic receivers may be combined prior to recording. For example, each of the seismic receivers of the array may be electrically interconnected and a single time series for the entire array may be recorded.

The next step 504 may be to modify a directionality function of the virtual source for seismic interferometry. This may involve combining at least two of the time series from the seismic receivers included in the array. This combining may be performed after the time series have been recorded by, for example, a computer processor and computer program product. This combining may involve performing mathematical operations on the output signals of the seismic receivers of the array prior to combining the outputs and recording a single time series for the array.

Figure 6:
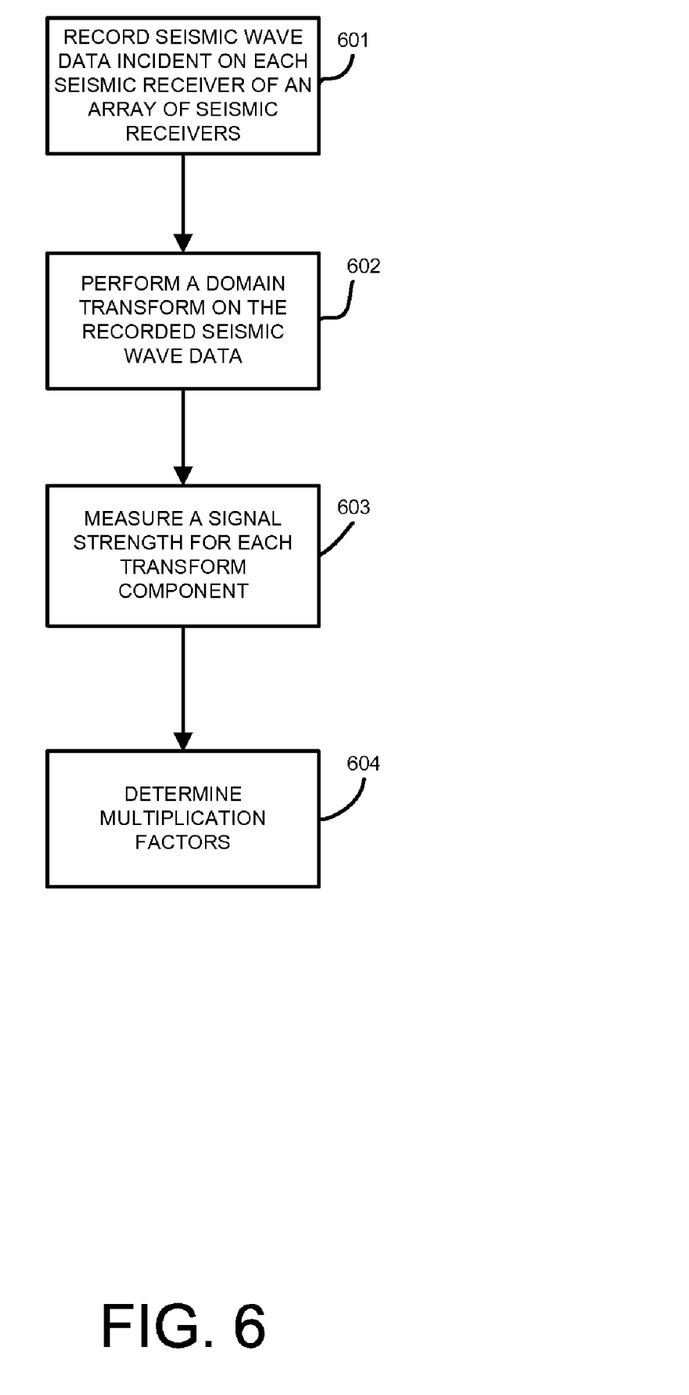
FIG. 6 is a flowchart for one embodiment of a method of modifying a directionality function of a virtual source used in seismic interferometry.

FIG. 6 is a flow chart of an embodiment of a method of modifying a directionality function of a virtual source used in seismic interferometry. Although the flow chart illustrates the steps in a particular order, this is for exemplary purposes only and the order of the steps may be rearranged from that depicted in FIG. 6. The first step 601 illustrated in FIG. 6 is to record seismic wave data incident on each seismic receiver of an array of seismic receivers. The virtual source may be associated with the area in which the array of seismic receivers is located.

The following step 602 may be to perform a domain transform on the recorded seismic wave data of step 601. This domain transform may be performed over the locations of the receivers of the array. The domain transform may separate the recorded seismic wave data into different transform components (e.g., different directionality components). This may be followed by step 603 in which a signal strength for each transform component is measured.

The next step 604 may be to determine multiplication factors where the multiplication factors are operable to convert the measured signal strength for each transform component into a desired signal strength for each transform component. The multiplication factors may be determined as described herein.

Figure 7:
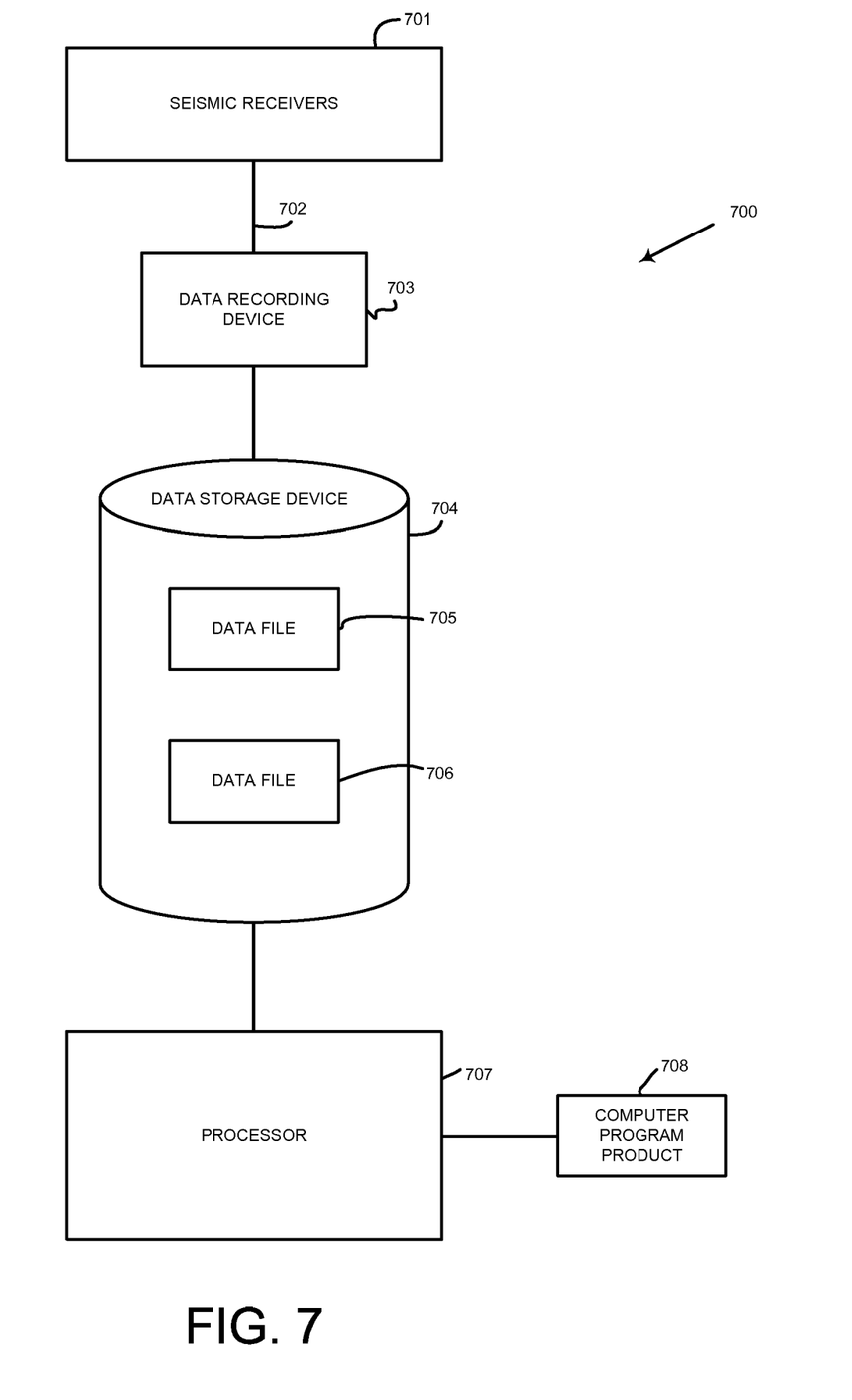
FIG. 7 is a block diagram of one embodiment of a system operable to obtain and store seismic data, modify a directionality function of a virtual source and perform seismic interferometry.

FIG. 7 is a block diagram of a system 700 operable to perform seismic interferometry. The system 700 may include a plurality of seismic receivers 701. The plurality of seismic receivers 701 may be arranged in an array or with a portion of the seismic receivers in an array and one or more remotely located seismic receivers. The seismic receivers 701 may be interconnected to a data recording device 703 via an interconnection 702. The interconnection 702 may take several forms. For example, the interconnection 702 may be a hardwired link between the seismic receivers 701 and a data recording device 703. In another example, the interconnection 702 may be a wireless link. In a further example, the interconnection 702 may be a virtual link where individual seismic receivers are capable of storing data pertaining to seismic waves incident on the individual seismic receiver on storage media (e.g., on a memory card or data storage disk). The data may then be transferred, via virtual interconnection 702, to the data recording device 703 by transferring the recorded data from the storage media to the data recording device 703. The interconnection 702 may comprise one or more of the foregoing (hardwired, wireless, virtual).

The data recording device 703 may be operable to record data (e.g., time series of seismic waves incident on each seismic receiver) generated by the seismic receivers 701 and store it on a data storage device 704. The data may be stored in the data storage device 704 in a variety of manners. For example, all of the data generated by the seismic receivers 701 may be stored in a single data file such as data file 705. In another example, all of the data generated by the seismic receivers of the array may be stored in a single data file such as data file 705 and the data generated by the seismic receiver or receivers used as secondary location receivers for seismic interferometry may be stored in a separate data file such as data file 706. Other data storage configurations, such as storing data generated by each individual seismic receiver of the seismic receivers 701 in its own data file, may be used.

The data storage device 704 may be interconnected to a processor 707 capable of executing a computer program product 708. The computer program product 708 may include computer program code stored, for example, on a storage medium (e.g., memory, optical disk, hard drive, floppy disk). The computer program code may be operable to perform any of the data processing (e.g., transforms, calculations, migrations) disclosed herein. In particular, the computer program code may enable the processor 707 to read one or more of the data files 705, 706 and to control a directionality function of a virtual source for seismic interferometry. The modifying of the directionality function may involve combining at least two time series from the seismic receivers included in the array.

The computer program code may enable the processor to determine the directionality function incident on the array (e.g., the processor may be operable to determine the directionality components). The computer program code may enable the processor to determine multiplication factors. The computer program code may enable the processor to apply the multiplication factors. The application of multiplication factors may take place at various steps of the seismic surveying process as previously discussed.

Although the above detailed description generally describes embodiments related to methods and apparatuses for modifying directionality of seismic interferometry data with the use of an array, embodiments described herein may be utilized in other seismic interferometry applications and in other configurations.

Additional modifications and extensions to the embodiments described above will be apparent to those skilled in the art. Such modifications and extensions are intended to be within the scope of the present invention as defined by the claims that follow.

What is claimed is:

1. A method of modifying a directionality function of a virtual source used in seismic interferometry, said method comprising:

recording seismic wave data incident on each individual seismic receiver of an array of seismic receivers, wherein each receiver of the array of seismic receivers has an associated location within the array;

performing a domain transform on the recorded seismic wave data over the array locations of the receivers to separate the recorded seismic wave data into different transform components, wherein each transform component corresponds to a type of wave that has some directionality;

measuring a signal strength measurement for each transform component; and determining multiplication factors to convert the measured signal strength for each transform component into a desired strength for each transform component.

2. The method of claim 1 wherein the multiplication factors are complex numbers.

3. The method of claim 1 further comprising:

using the array of seismic receivers is used in performing seismic interferometry to obtain information related to subsurface structure.

4. The method of claim 1 further comprising:

co-locating the array of seismic receivers in a region with another array of seismic receivers used in performing seismic interferometry to obtain information related to subsurface structure.

5. The method of claim 1 wherein said determining of multiplication factors comprises:

dividing the desired strength for each individual transform component by the measured signal strength for each individual transform component.

6. The method of claim 5 wherein said determining of multiplication factors further comprises:

increasing a measured signal strength below a predetermined threshold to a value exceeding the predetermined threshold prior to said dividing.

7. The method of claim 1, wherein the domain transform comprises at least one of a Slant Stack, a Fourier Transform, a discreet cosine Transform, a Radon Transform, a Gabor Transform, and a Wigner Transform.

8. The method of claim 1, wherein the domain transform is performed with an edge taper or other uneven weighting across the array.

9. The method of claim 1, wherein the seismic wave data is in one of a time domain or a derivative domain of the time domain.

10. The method of claim 9, wherein separate multiplication factors are determined for each value in the derivative domain of the time domain.

11. The method of claim 10 wherein the derivative domain of the time domain is the frequency domain and wherein separate multiplication factors are determined for each frequency value in the frequency domain.

12. The method of claim 1, wherein the domain transform is performed over time window subsets of a full time series from the receivers and different multiplication factors are determined for each time window.

13. The method of claim 1, wherein each transform component corresponds with a directionality component and wherein the signal strength measurement for each directionality component comprises a single measurement for each directionality component.

14. The method of claim 1, wherein each transform component corresponds with a directionality component and wherein the signal strength measurement for each directionality component comprises a plurality of measurements for each directionality component.

15. The method of claim 1, wherein a domain in which the seismic wave data is recorded comprises a space domain and wherein a domain into which the recorded seismic wave data is transformed comprises a transform domain, and wherein said method further comprises:

transforming the multiplication factors from the transform domain to the space domain whereby the multiplication factors comprise mathematical operations to perform on the individual receivers of an array of seismic receivers.

16. The method of claim 15 wherein the mathematical operations comprise at least one of multiplication factors, time shifts of a time series, and phase shifts in the frequency domain.

17. The method of claim 1, wherein said recording of the seismic wave data is performed for multiple ground motion components, wherein said performing a domain transform is performed separately for each of the multiple ground motion components, and wherein said determining multiplication factors is performed for each of the multiple ground motion components.

18. A method of modifying a directionality function of a virtual source used in seismic interferometry, said method comprising:

executing computer readable program code with a processor to implement the steps of:

reading data stored on a data storage device, the data comprising recorded seismic wave data incident on each individual seismic receiver of an array of seismic receivers, wherein each receiver of the array of seismic receivers has an associated location within the array;

performing a domain transform on the recorded seismic wave data over the array locations of the receivers to separate the recorded seismic wave data into different transform components, wherein each transform component corresponds to a type of wave that has some directionality;

measuring a signal strength measurement for each transform component; and determining multiplication factors to convert the measured signal strength for each transform component into a desired strength for each transform component.

19. The method of claim 18 wherein the multiplication factors are complex numbers.

20. The method of claim 18 further comprising:
using the array of seismic receivers in performing seismic interferometry to obtain information related to subsurface structure.

21. The method of claim 18 further comprising:
co-locating the array of seismic receivers in a region with another array of seismic receivers used in performing seismic interferometry to obtain information related to subsurface structure.

22. The method of claim 18 wherein said determining of multiplication factors comprises:
dividing the desired strength for each individual transform component by the measured signal strength for each individual transform component.

23. The method of claim 22 wherein said determining of multiplication factors further comprises:
increasing a measured signal strength below a predetermined threshold to a value exceeding the predetermined threshold prior to said dividing.

24. The method of claim 18, wherein the domain transform comprises at least one of a Slant Stack, a Fourier Transform, a discreet cosine Transform, a Radon Transform, a Gabor Transform, and a Wigner Transform.

25. The method of claim 18, wherein the domain transform is performed with an edge taper or other uneven weighting across the array.

26. The method of claim 18, wherein the seismic wave data is in one of a time domain or a derivative domain of the time domain.

27. The method of claim 26, wherein separate multiplication factors are determined for each value in the derivative domain of the time domain.

28. The method of claim 27 wherein the derivative domain of the time domain is the frequency domain and wherein separate multiplication factors are determined for each frequency value in the frequency domain.

29. The method of claim 18, wherein the domain transform is performed over time window subsets of a full time series from the receivers and different multiplication factors are determined for each time window.

30. The method of claim 18, wherein each transform component corresponds with a directionality component and wherein the signal strength measurement for each directionality component comprises a single measurement for each directionality component.

31. The method of claim 18, wherein each transform component corresponds with a directionality component and wherein the signal strength measurement for each directionality component comprises a plurality of measurements for each directionality component.

32. The method of claim 18, wherein a domain in which the seismic wave data has been recorded comprises a space domain and wherein a domain into which the recorded seismic wave data is transformed comprises a transform domain, and wherein said method further comprises:

executing computer readable program code with the processor to implement the step of:

transforming the multiplication factors from the transform domain to the space domain whereby the multiplication factors comprise mathematical operations to perform on the individual receivers of an array of seismic receivers.

33. The method of claim 32 wherein the mathematical operations comprise at least one of multiplication factors, time shifts of a time series, and phase shifts in the frequency domain.

34. The method of claim 18, wherein the seismic wave data has been recorded for multiple ground motion components, wherein said performing a domain transform is performed separately for each of the multiple ground motion components, and wherein said determining multiplication factors is performed for each of the multiple ground motion components.

35. A system operable to modify a directionality function of a virtual source used in seismic interferometry, said system comprising:
- at least one data storage device, the data storage device storing data comprising recorded seismic wave data incident on each individual seismic receiver of an array of seismic receivers, wherein each receiver of the array of seismic receivers has an associated location within the array; and
- a processor enabled to:
    - read the recorded seismic wave data stored on the at least one data storage device;
    - perform a domain transform on the recorded seismic wave data over the array locations of the receivers to separate the recorded seismic wave data into different transform components, wherein each transform component corresponds to a type of wave that has some directionality;
    - measure a signal strength measurement for each transform component; and
    - determine multiplication factors to convert the measured signal strength for each transform component into a desired strength for each transform component.

36. The system of claim 35 wherein the multiplication factors are complex numbers.

37. The system of claim 35 wherein the processor is further enabled to:
- use the array of seismic receivers in performing seismic interferometry to obtain information related to subsurface structure.

38. The system of claim 35 wherein the array of seismic receivers is co-located in a region with another array of seismic receivers used in performing seismic interferometry to obtain information related to subsurface structure.

39. The system of claim 35 wherein in determining the multiplication factors, the processor is enabled to:
- divide the desired strength for each individual transform component by the measured signal strength for each individual transform component.

40. The system of claim 39 wherein in determining the multiplication factors, the processor is further enabled to:
- increase a measured signal strength below a predetermined threshold to a value exceeding the predetermined threshold prior to said dividing.

41. The system of claim 35, wherein the domain transform comprises at least one of a Slant Stack, a Fourier Transform, a discreet cosine Transform, a Radon Transform, a Gabor Transform, and a Wigner Transform.

42. The system of claim 35, wherein the processor is enabled to perform the domain transform with an edge taper or other uneven weighting across the array.

43. The system of claim 35, wherein the seismic wave data is in one of a time domain or a derivative domain of the time domain.

44. The system of claim 43, wherein the processor is enabled to determine separate multiplication factors for each value in the derivative domain of the time domain.

45. The system of claim 44 wherein the derivative domain of the time domain is the frequency domain and wherein the processor is enabled to determine separate multiplication factors for each frequency value in the frequency domain.

46. The system of claim 35, wherein the processor is enabled to perform the domain transform over time window subsets of a full time series from the receivers and to determine different multiplication factors for each time window.

47. The system of claim 35, wherein each transform component corresponds with a directionality component and wherein the signal strength measurement for each directionality component comprises a single measurement for each directionality component.

48. The system of claim 35, wherein each transform component corresponds with a directionality component and wherein the signal strength measurement for each directionality component comprises a plurality of measurements for each directionality component.

49. The system of claim 35, wherein a domain in which the seismic wave data is recorded comprises a space domain and wherein a domain into which the processor is enabled to transform the recorded seismic wave data comprises a transform domain, and wherein the processor is further enabled to:
- transform the multiplication factors from the transform domain to the space domain whereby the multiplication factors comprise mathematical operations to perform on the individual receivers of an array of seismic receivers.

50. The system of claim 49 wherein the mathematical operations comprise at least one of multiplication factors, time shifts of a time series, and phase shifts in the frequency domain.

51. The system of claim 35, wherein the recorded seismic wave data has been recorded for multiple ground motion components, wherein the processor is enabled to perform a separate domain transform for each of the multiple ground motion components, and wherein the processor is enabled to determine multiplication factors for each of the multiple ground motion components.

* * * * *